(12) United States Patent
Romanello et al.

(10) Patent No.: US 10,563,540 B2
(45) Date of Patent: Feb. 18, 2020

(54) CASING FOR A ROTATING MACHINE AND ROTATING MACHINE INCLUDING SUCH CASING

(71) Applicant: Nuovo Pignone SRL, Florence (IT)

(72) Inventors: Paolo Romanello, Florence (IT);
Stefano Mantellassi, Florence (IT);
Alberto Guglielmo, Florence (IT);
Giuseppe Sassanelli, Florence (IT)

(73) Assignee: Nuovo Pignone SRL, Florence (IT)

( * ) Notice: Subject to any disclaimer, the term of this patent is extended or adjusted under 35 U.S.C. 154(b) by 874 days.

(21) Appl. No.: 15/028,054

(22) PCT Filed: Oct. 1, 2014

(86) PCT No.: PCT/EP2014/071089
§ 371 (c)(1),
(2) Date: Apr. 8, 2016

(87) PCT Pub. No.: WO2015/052060
PCT Pub. Date: Apr. 16, 2015

(65) Prior Publication Data
US 2016/0245121 A1   Aug. 25, 2016

(30) Foreign Application Priority Data

Oct. 8, 2013   (IT) .............................. CO2013A0044

(51) Int. Cl.
*F01D 25/24* (2006.01)
*F01D 11/00* (2006.01)
(Continued)

(52) U.S. Cl.
CPC .......... *F01D 25/243* (2013.01); *F01D 11/005* (2013.01); *F04D 27/001* (2013.01);
(Continued)

(58) Field of Classification Search
None
See application file for complete search history.

(56) References Cited

U.S. PATENT DOCUMENTS 1,058,936 A * 4/1913 Bancel .................. F04D 29/063
285/405
1,828,408 A * 10/1931 Guy ...................... F01D 25/243
415/177

(Continued)

FOREIGN PATENT DOCUMENTS

CN         86102491 A     9/1987
CN         86102816 A     11/1987
(Continued)

OTHER PUBLICATIONS

Office Action issued in connection with corresponding RU Application No. 2016112261 dated May 17, 2018 (English translation not available).

(Continued)

*Primary Examiner* — Kayla Mccaffrey
(74) *Attorney, Agent, or Firm* — Baker Hughes Patent Organization

(57) ABSTRACT

A casing for a rotating machine includes an inner surface delimiting an inner volume for housing a rotor of the rotating machine; a first and a second shell that are joined together in a dividable manner, the first and second shell respectively comprising a first and a second split flange having a first and a second split surface contacting each other when the shells are joined together; a plurality of holes on the first and second split flange passing through the first and second split surface for housing a plurality of bolts; a first groove connecting the plurality of holes; a second groove between the first groove and the inner surface of the casing; a first (Continued)

duct and a second duct for circulating a fluid to and from the first and second grooves, respectively.

5 Claims, 3 Drawing Sheets

(51) Int. Cl.
    *F04D 27/00*      (2006.01)
    *F04D 29/08*      (2006.01)
    *F04D 29/52*      (2006.01)

(52) U.S. Cl.
    CPC ......... *F04D 29/083* (2013.01); *F04D 29/522* (2013.01); *F05D 2220/30* (2013.01); *F05D 2260/31* (2013.01)

(56) References Cited

U.S. PATENT DOCUMENTS

| | | | | |
|---|---|---|---|---|
| 2,211,874 | A * | 8/1940 | Wilson | F01D 25/243 415/199.5 |
| 3,055,538 | A | 9/1962 | Schoessow | |
| 3,390,830 | A * | 7/1968 | Kahane | F01D 25/243 285/14 |
| 3,430,801 | A | 3/1969 | Homrig | |
| 3,979,014 | A | 9/1976 | Iwase et al. | |
| 4,660,838 | A | 4/1987 | Katayama et al. | |
| 5,076,591 | A * | 12/1991 | Gentile | F01D 11/003 220/378 |
| 6,227,575 | B1 * | 5/2001 | Monning | F01D 25/243 285/187 |
| 6,352,404 | B1 * | 3/2002 | Czachor | F01D 25/243 415/116 |
| 7,185,499 | B2 * | 3/2007 | Chereau | F01D 11/18 60/751 |
| 8,118,551 | B2 | 2/2012 | Ichiryu et al. | |
| 9,127,558 | B2 * | 9/2015 | Soundiramourty | F01D 9/041 |

FOREIGN PATENT DOCUMENTS

| | | |
|---|---|---|
| CN | 201902416 U | 7/2011 |
| DE | 230913 A1 | 12/1985 |
| EP | 1933038 A1 | 6/2008 |
| JP | S54-035507 A | 3/1979 |
| JP | 5479312 A | 6/1979 |
| JP | S54-079312 A | 6/1979 |
| JP | H06-058834 A | 3/1994 |
| JP | S61-114011 U | 3/1994 |
| JP | H06-137987 A | 5/1994 |
| JP | H07-083004 A | 3/1995 |
| RU | 1367601 C | 7/1995 |
| RU | 83291 U1 | 5/2009 |
| WO | 2010/003875 A2 | 1/2010 |
| WO | 2012/117016 A1 | 9/2012 |

OTHER PUBLICATIONS

Machine translation and Notification of Reasons for Refusal issued in connection with corresponding JP Application No. 2016-519846 dated Jul. 31, 2018.

Notice of Allowance issued in connection with corresponding RU Application No. 2016112261 dated Aug. 23, 2018.

Unofficial English Translation of Chinese Office Action issued in connection with corresponding CN Application No. 201480055708.5 dated Nov. 1, 2016.

International Search Report and Written Opinion issued in connection with corresponding Application No. ITCO20130044 dated Jan. 16, 2014.

International Search Report and Written Opinion issued in connection with corresponding Application No. PCT/EP2014/071089 dated Jan. 15, 2015.

* cited by examiner

CASING FOR A ROTATING MACHINE AND ROTATING MACHINE INCLUDING SUCH CASING

BACKGROUND

Embodiments of the present invention relate to a casing for a rotating machine, for example a turbomachine such as steam turbine or a gas compressor, including sealing devices for controlling the sealing performance of the casing. Embodiments of the present invention also relate to a rotating machine including such casing.

BRIEF DESCRIPTION OF THE INVENTION

In the above field, it is known to build casings including two half shells joined together along respective split flanges, where sealing is granted by the pulling force applied on the flanges by a plurality of bolts. In some applications an area around the bolt holes is machined to reduce the contact area, thus improving the sealing.

Typically, no means to detect a gas leak from the split flange are present inside the machine. Existing solutions to prevent external gas leaks, e.g. that described in U.S. Pat. No. 8,118,551, involve additional components or operations during production and do not allow the protection of the split flange bolts from process gas exposure.

Disadvantages of the existing solutions, in particular of that described in U.S. Pat. No. 8,118,551, are: no preemptive action is possible to avoid risk for people or machines. Only an emergency reaction can be adopted in case of leak, especially when hazardous or aggressive gases are processed; in case of leak of process gas, no control of the leak source is possible and a shutdown of the machine is normally required for inspection and for defining possible corrective actions; known solutions are either outside AP1617 or involve additional components or operations during production and maintenance with increased cost and complexity; no embedded control system can be applied to passively or actively control the sealing performance and an eventual leak It would be therefore desirable to provide an improved casing which could avoid the inconveniences above described.

According to a first embodiment, the present invention accomplishes such an object by providing a casing for a rotating machine including an inner surface delimiting an inner volume for housing a rotor of the rotating machine; a first and a second shell that are joined together in a dividable manner in order to constitute the inner volume, the first and second shell respectively comprising a first and a second split flange with, respectively, a first and second split surface contacting each other when the shells are joined together; a plurality of holes on the first and second split flange passing through the first and second split surface, the holes being dimensioned for housing a plurality of bolts for joining the first and second shells; a first groove on one of the first and second split surface connecting the plurality of holes; a second groove on one of the first and second split surfaces, between the first groove and the inner surface of the casing; a first duct in one of the first and second flange for circulating a fluid to and from the first grove; a second duct in one of the first and second flange for circulating a fluid to and from the second groove.

The presence of the separation groove around the bolt holes and of another groove, i.e. the control groove, between the separation groove and the internal casing diameter permits to efficiently monitoring and controlling leaks of process gas from the inner volume of the machine.

BRIEF DESCRIPTION OF THE DRAWINGS

Other object feature and advantages of embodiments of the present invention will become evident from the following description of the embodiments of the invention taken in conjunction with the following drawings, wherein.

DETAILED DESCRIPTION

Figure 1:
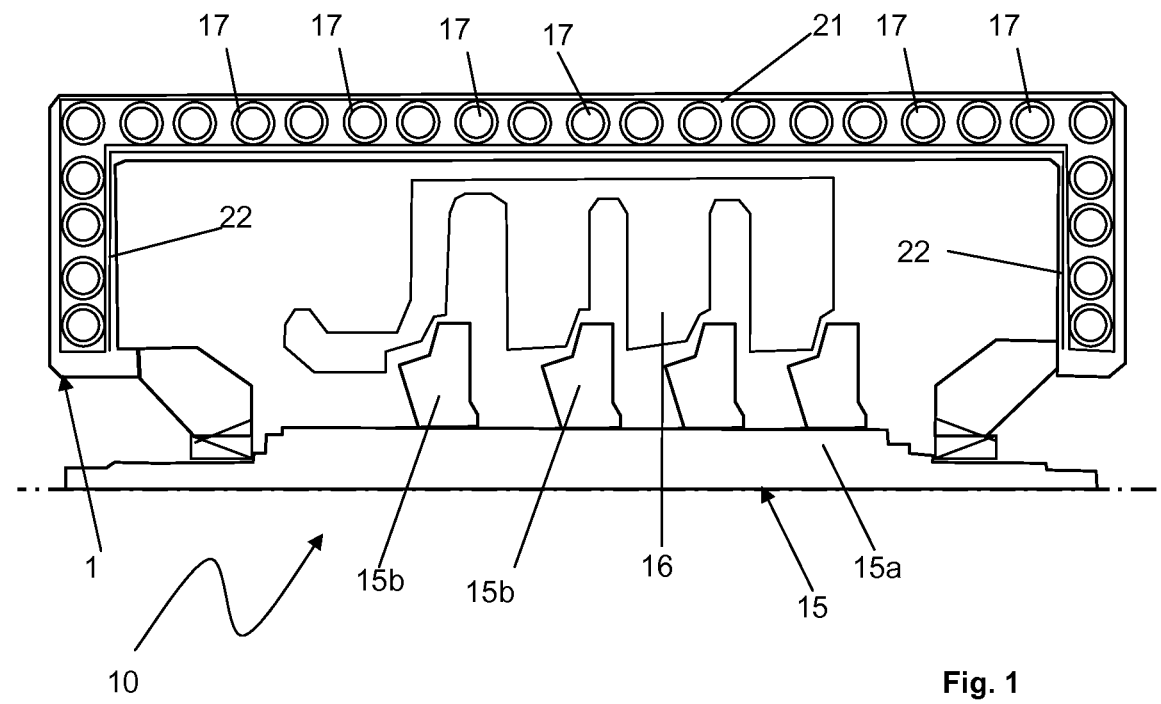
FIG. 1 is a view of a rotating machine including a casing according to an embodiment of the present invention.

With reference to the attached Figures, a casing 1 for a rotating machine 10, for example a steam turbine (not represented) or a gas compressor (FIG. 1), includes an inner surface S delimiting an inner volume V for housing a rotor of the rotating machine 10. The casing 1 includes a first upper shell 11 and a second lower shell 12 that are joined together in a dividable manner in order to constitute the inner volume V. The first and second shells 11, 12 respectively comprise a first and a second split flange 13, 14 which respectively comprise a first and second split surface 13a, 14a. The first and second split surfaces 13a, 14a contact each other along a split plane A when the shells 11, 12 are joined together to form the casing 1, thus constituting the inner volume V for housing the rotor of the rotating machine 10.

The casing 1 comprises a plurality of blind holes 17 on the first and second split flanges 13, 14 for joining the first and second shells 11, 12. The blind holes pass through the first and second split surfaces 13a, 14a and are dimensioned for housing a plurality of bolts (not represented). Each blind hole 17 is constituted by a first through portion 17a and a second blind bottom portion 17b. The first through portion 17a passes through the first split flange 13, extending from the first split surface 13a to an opposite surface 13b. The second bottom portion 17b comprises a thread and extends in the second split flange 14, extending from the second split surface 14a. When the shells 11, 12 are joined together to form the casing 1, each blind hole 17 is constituted by a respective couple of hole portions 17a, 17b, aligned to each other. After joining them together, the shells 11, 12 are fastened together by a plurality of bolts (not represented) respectively housed in the plurality of blind holes 17. Each bolt is screwed at one end to the respective bottom portion 17b and, at the opposite end, to a respective nut (not represented) acting on the opposite surface 13b.

Figure 2:
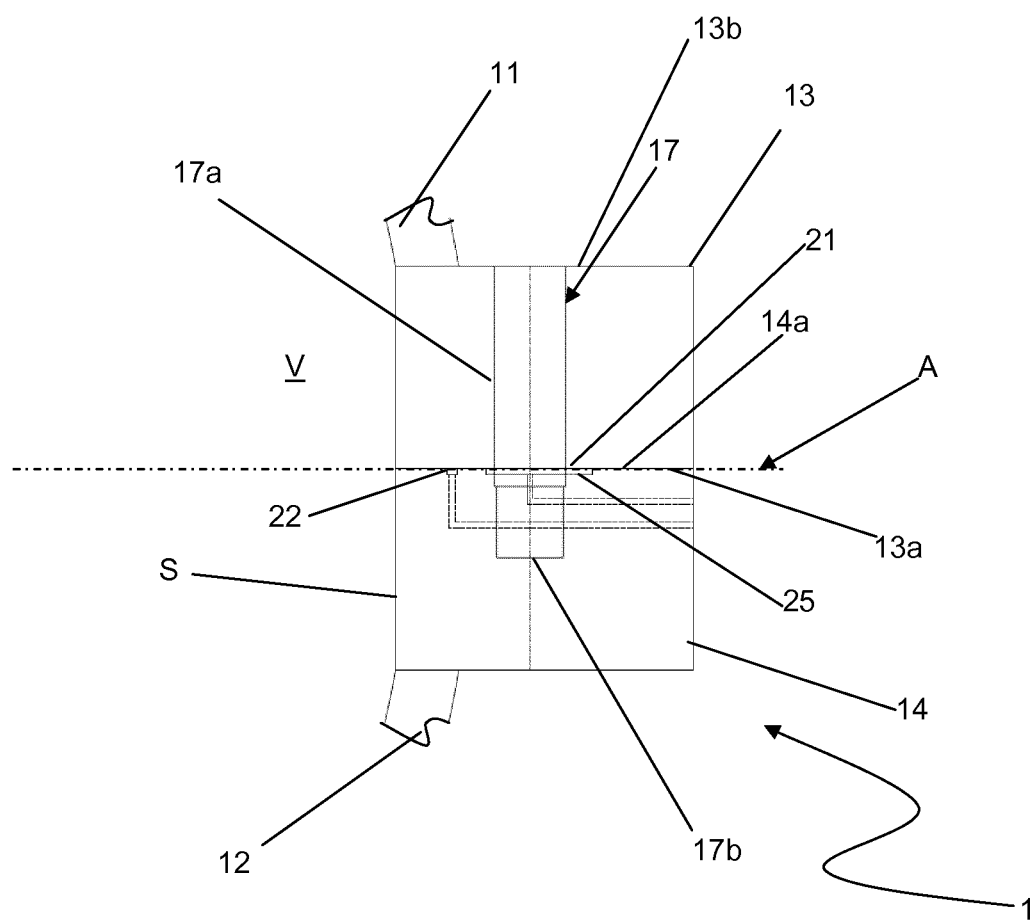
FIG. 2 is section view of a detail of the casing in FIG. 1.
Figure 3:
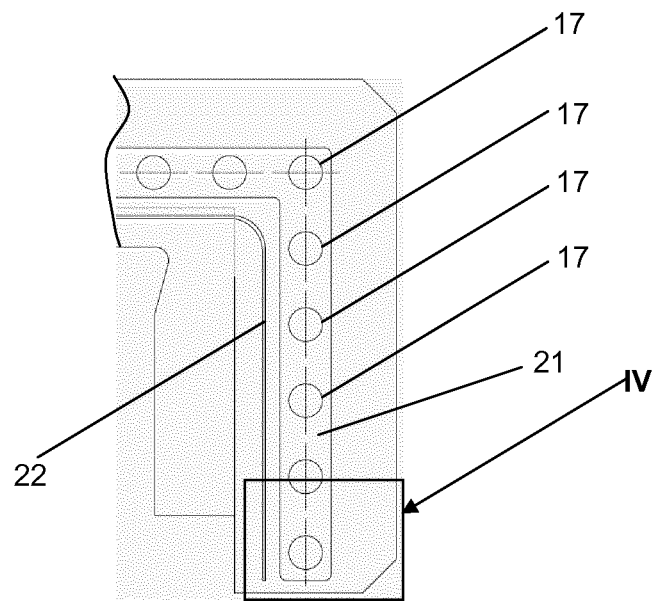
FIG. 3 is a longitudinal view of a detail of the casing in FIG. 1.
Figure 4:
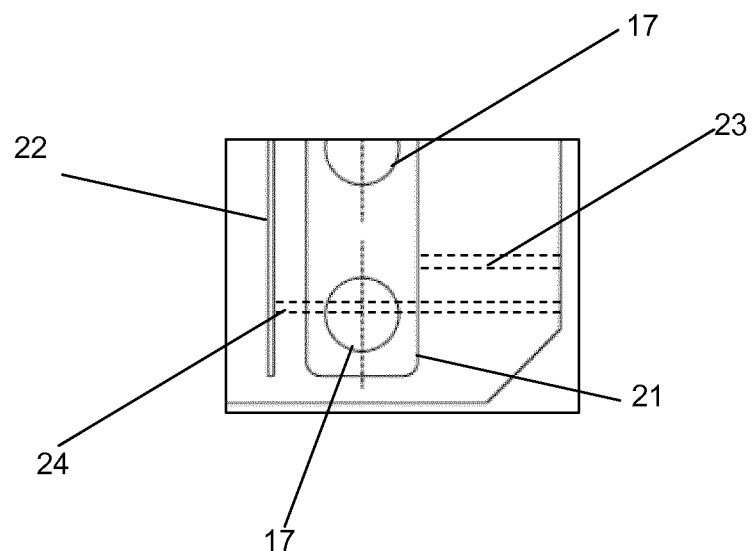
FIG. 4 is an enlarged view of detail IV in FIG. 3.
Figure 5:
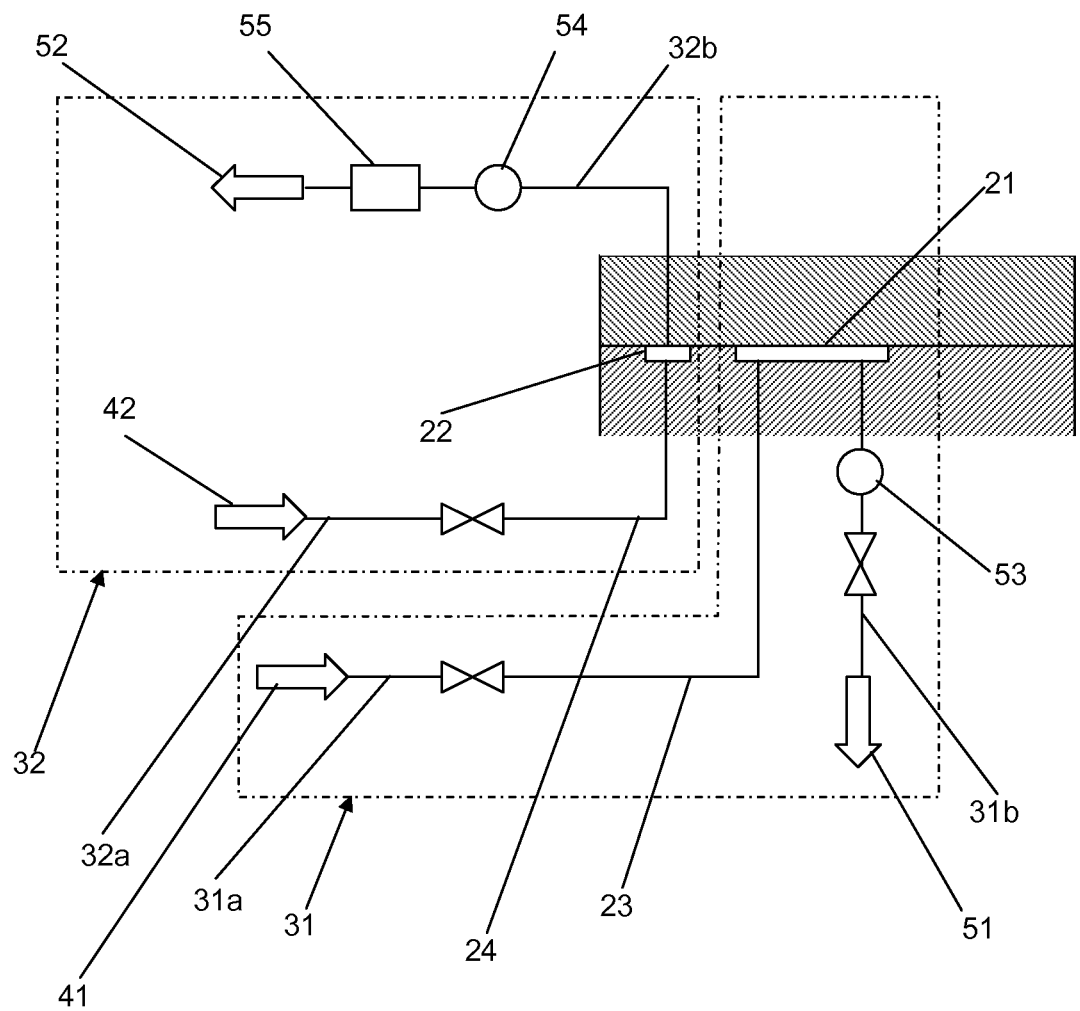
FIG. 5 is a partial schematic diagram of a machine including the casing of the present invention.

The casing 1 further comprises a first separation groove 21 on the second split surface 14a connecting between them all the holes of the plurality of holes 17. In the second flange 14, the open end of each blind portion 17b of each hole 17 communicates with the first separation groove 21. The separation groove 21 comprises a bottom flat surface 25, which is parallel to the split plane A. Therefore, in a sectional view perpendicular to the split plane A (FIG. 2), the separation groove 21 is rectangular in shape. The separation groove 21 has a width, i.e. a dimension along a direction parallel to the split plane A and perpendicular to the axis of the holes 17, which is greater than the diameter of the holes 17, and is positioned in order to completely encircle each of the holes 17.

According to a different embodiment (not represented in the drawings) of the present invention, the separation groove is defined on the first split surface 13a.

According to another embodiment (not represented in the drawings) of the present invention, the separation groove is defined on both the first and second split surfaces 13a, 14a.

The casing 1 further comprises a narrow second control groove 22 on the second split surface 14a, between the first separation groove 21 and the inner surface S of the casing 1.

According to a different embodiment (not represented in the drawings) of the present invention, the second control groove is defined on the first split surface 13a.

According to another embodiment (not represented in the drawings) of the present invention, the second control groove is defined on both the first and second split surfaces 13a, 14a.

The casing 1 comprises a first and a second duct 23, 24 in the second flange 14 for circulating a respective fluid to and from the first and second grooves 21, 22, respectively.

Alternatively, according to different embodiments (not represented in the drawings) of the present invention, one or both of the first and second ducts 23, 24 are provided for in the first flange 13.

The first and second ducts 23, 24 are connected with a source of inert gas, for example nitrogen ($N_2$), by means of a first and a second fluid circuit 31, 32, respectively.

The first fluid circuit 31 comprises a first input branch 31a for connecting a first source of inert gas 41 to the first duct 23 and a first output branch 31b for connecting the first groove 21 to a first vent 51. The first output branch 31b comprises at least a pressure transducer 53.

The second fluid circuit 32 comprises a second input branch 32a for connecting a second source 42 of inert gas to the second duct 24 and a second output branch 32b for connecting the second groove 22 to a second vent 52. The second output branch 32b comprises at least a second pressure transducer 54 and a gas detector 55 for detecting gas leakages from the second groove 22.

When the process gas inside the inner volume V eventually overcomes the contact pressure that exists between the first and second split flanges 13, 14 of the casing 1, the second control groove 22 collects the leak and cleans out the leaked gas through the vent.

In addition, the separation groove 21 is pressurized to constitute a further gas barrier which actively blocks the leak, not allowing the process gas to reach the bolts.

Advantages of the above-described solution are: possibility of taking corrective actions without a machine shutdown; isolation of the bolts in the split flanges from possible gas leakages; possibility to be integrated in existing machines with very limited costs; compliance with API617 as no gaskets on split surfaces are involved; contact improvement due to the reduction of contact area.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A casing for a rotating machine, the casing comprising:
    an inner surface delimiting an inner volume for housing a rotor of the rotating machine;
    a first shell and a second shell that are joined together in a dividable manner in order to constitute the inner volume, the first shell and the second shell respectively comprising a first split flange and a second split flange with, respectively, a first split surface and a second split surface contacting each other when the shells are joined together;
    a plurality of holes on the first split flange and the second split flange passing through the first split surface and second split surface, the holes being dimensioned for housing a plurality of bolts for joining the first shell and the second shell;
    a first groove on one of the first split surface and the second split surface connecting the plurality of holes;
    a second groove on one of the first split surface and the second split surface, between the first groove and the inner surface of the casing;
    a first duct in the first split flange or the second split flange, in fluid communication with the first groove; and
    a second duct in the first split flange or the second split flange, in fluid communication with the second groove,
    wherein the first duct connects the first groove to an inert gas source.

2. The casing according to claim 1, wherein the second duct connects the second groove to an inert gas source.

3. A casing for a rotating machine, the casing comprising:
    an inner surface delimiting an inner volume for housing a rotor of the rotating machine;
    a first shell and a second shell that are joined together in a dividable manner in order to constitute the inner volume, the first shell and the second shell respectively comprising a first split flange and a second split flange with, respectively, a first split surface and a second split surface contacting each other when the shells are joined together;
    a plurality of holes on the first split flange and the second split flange passing through the first split surface and second split surface, the holes being dimensioned for housing a plurality of bolts for joining the first shell and the second shell;
    a first groove on one of the first split surface and the second split surface connecting the plurality of holes;
    a second groove on one of the first split surface and the second split surface, between the first groove and the inner surface of the casing;
    a first duct in the first split flange or the second split flange, in fluid communication with the first groove; and
    a second duct in the first split flange or the second split flange, in fluid communication with the second groove,
    wherein the second duct connects the second groove to an inert gas source.

4. A rotating machine comprising:
    a casing comprising:
        an inner surface delimiting an inner volume for housing a rotor of the rotating machine;
        a first shell and a second shell that are joined together in a dividable manner in order to constitute the inner volume, the first shell and the second shell respectively comprising a first split flange and a second split flange with, respectively, a first split surface and a second split surface contacting each other when the shells are joined together;

a plurality of holes on the first split flange and the second split flange passing through the first split surface and second split surface, the holes being dimensioned for housing a plurality of bolts for joining the first shell and the second shell;

a first groove on one of the first split surface and the second split surface connecting the plurality of holes;

a second groove on one of the first split surface and the second split surface, between the first groove and the inner surface of the casing;

a first duct in the first split flange or the second split flange, in fluid communication with the first groove; and a second duct in the first split flange or the second split flange, in fluid communication with the second groove; and a first fluid circuit and a second fluid circuit, each of the first fluid circuit and the second fluid circuit comprising an input branch for connecting a source of fluid with the first duct and the second duct, respectively, and an output branch for connecting the first groove or the second groove, respectively, to a vent, the output branch comprising a pressure transducer for monitoring pressure inside the first groove and second groove.

5. The rotating machine according to claim 4, wherein the output branch of the second circuit further comprises a fluid detector for detecting if process fluid from the inner volume leaks into the second circuit.

* * * * *